United States Patent [19]

Kikuta et al.

[11] 4,246,882
[45] Jan. 27, 1981

[54] COMBUSTION CHAMBER FOR SIDE-VALVE TYPE INTERNAL-COMBUSTION ENGINE

[75] Inventors: Kojiro Kikuta; Katsumi Kurihara; Shohei Suzuki, all of Nagoya; Teruaki Sasaki, Komaki, all of Japan

[73] Assignee: Mitsubishi Jukogyo Kabushiki Kaisha, Tokyo, Japan

[21] Appl. No.: 31,527

[22] Filed: Apr. 19, 1979

Related U.S. Application Data

[63] Continuation-in-part of Ser. No. 895,506, May 23, 1980, abandoned, which is a continuation of Ser. No. 720,625, Sep. 3, 1976, abandoned.

[51] Int. Cl.³ .............................................. F02B 23/08
[52] U.S. Cl. ..................................... 123/658; 123/661
[58] Field of Search ............ 123/191 R, 191 L, 193 H, 123/193 CH, 193 R

[56] References Cited

U.S. PATENT DOCUMENTS

| | | | |
|---|---|---|---|
| 2,073,620 | 3/1937 | Bicknell | 123/191 L |
| 2,076,593 | 4/1937 | Ricardo | 123/191 R |
| 2,138,131 | 11/1938 | Aske | 123/191 L |

FOREIGN PATENT DOCUMENTS 358908 10/1931 United Kingdom ................ 123/191 L Primary Examiner—Craig R. Feinberg
Attorney, Agent, or Firm—Toren, McGeady and Stanger

[57] ABSTRACT

A side-valve type internal-combustion engine has a cylinder head formed with a recess or recesses each of which forms a combustion chamber with the associated cylinder and which is large enough to permit the alternate flow of suction or exhaust gas between the suction (inlet) or exhaust valve and the cylinder. In plan, the configuration of the recess is generally L-shaped and covers the both valves and part of the cylinder. One leg of the L-shaped recess provides a straight line passage between the suction or inlet valve and the cylinder, while the exhaust valve and the cylinder are connected in series by the one leg of the recess from the cylinder to the suction valve and then by the other leg from the suction valve to the exhaust valve. The height of the recess is reduced in the region directly above the exhaust valve to a level considerably lower than the rest of the recess so that the upper wall surface of the recess is very close to the exhaust valve when it is in its uppermost position.

1 Claim, 7 Drawing Figures

COMBUSTION CHAMBER FOR SIDE-VALVE TYPE INTERNAL-COMBUSTION ENGINE

This is a continuation-in-part of U.S. Patent Application Ser. No. 895,506 now abandoned which was a continuation of U.S. Patent Application Ser. No. 720,625, now abandoned.

SUMMARY OF THE INVENTION

This invention relates to the combustion chambers as typically represented in FIGS. 1 and 3. FIG. 1 is a phantom view of such a chamber as seen from above the cylinder head, and FIG. 3 is a sectional view taken along the line A—A of FIG. 1.

As shown, the suction valve 2 and the exhaust valve 3 are located offset a certain distance from the cylinder 1. The recess 5 formed in the cylinder head 4 permits the passage therethrough of the fuel-air mixture from the suction valve 2 to the cylinder 1 and of the exhaust gas from the cylinder to the exhaust valve 3. The transverse configuration of the recess 5 is substantially trapezoidal, covering the suction and exhaust valves and part of the cylinder, so that the charge can flow from the suction valve 2 to the cylinder and, after the combustion, to the exhaust valve 3, in either case along a generally straight path. As indicated in FIG. 3, the recess 5 is of substantially the same depth, or height, from the openings of the suction and exhaust valves. The recess, which together with the upper portion of the cylinder 1 forms a combustion chamber, is rather flat and has a far less volume per unit surface area of its walls than the corresponding recess of the overhead-valve engine. The side-valve type, therefore, has had the following disadvantages:

(1) Requires longer fuel combustion time and involves slower increase in cylinder pressure and lower output per stroke volume. Hence greater fuel consumption.

(2) The rate of unburned fuel deposition on the combustion chamber wall is higher, with a consequent increase in the hydrocarbon contents of the exhaust.

In an attempt to eliminate these disadvantages and increase the recess capacity per unit wall area, a modified agreement as shown in FIG. 2 has been proposed. Like FIG. 1, the figure is a phantom plan view of the cylinder head, and a section through the line A—A of FIG. 2 is identical with FIG. 3 showing the original arrangement. As can be seen from FIG. 2 in comparison with FIG. 1, this modified arrangement dispenses with the straight line passage of the charge from the suction valve 2 to the cylinder 1 in FIG. 1, and the horizontal sectional area of the recess 5 is accordingly much smaller than that in FIG. 1. However, the modified design still has a disadvantage of increased flow passage resistance from the suction or inlet valve to the cylinder due to the provision of a corner 5a, as shown in FIG. 2, which causes the suction gas to adopt a curved flow path as indicated by broken-line arrows.

In another prior art arrangement as shown in U.S. Pat. No. 2,076,593 to Ricardo, the recess has a horizontal shape as shown in FIG. 1. Reduced head room is provided over the exhaust valve and provides a mounting for the spark plug. This arrangement does nothing to reduce the heat loading on the exhaust valve, since combustion commences directly over the exhaust valve.

In British Pat. No. 358,908 the recess is in the shape of a free form triangle. Flow passes directly to the exhaust valve from the cylinder. In this arrangement the spark plug is located above the cylinder.

In the U.S. Pat. No. 1,875,589 an L-shaped recess is shown, however, the intake valve is at the remote end of the L-shaped passage and the spark plug is located directly over the exhaust valve.

An object of the present invention is to provide a side-valve type internal-combustion engine which eliminates the afore-mentioned disadvantages and achieves improved fuel consumption as well as reduction of noxious exhaust emissions while attaining enhanced power output per unit stroke volume of the cylinder by increasing the combustion chamber volume per unit surface area of the surrounding walls.

This object of the invention is attained by providing a combustion chamber for a side-valve type internal-combustion engine wherein the cylinder head is formed with a generally L-shaped recess or recesses each of which is large enough to permit the alternate flow therethrough of suction or exhaust gas between the suction or exhaust valve and the associated cylinder, characterized in that the L-shaped plan configuration of the recess covers the suction and exhaust valves and part of the cylinder, and the suction valve communicates in a straight line with the cylinder while the exhaust valve is communicated with the cylinder by way of the recess located above the suction valve. In other words, the L-shaped recess has two angularly disposed legs, one extending from the cylinder to the suction valve and the other from the suction valve to the exhaust valve. As a result, flow from the cylinder first passes through the one leg and then through the other flowing an L-shaped path. Further, the height of the recess is reduced in the region above the exhaust valve to a level much lower than the rest of the recess and adequately close to the exhaust valve when it is in the uppermost position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 4A:
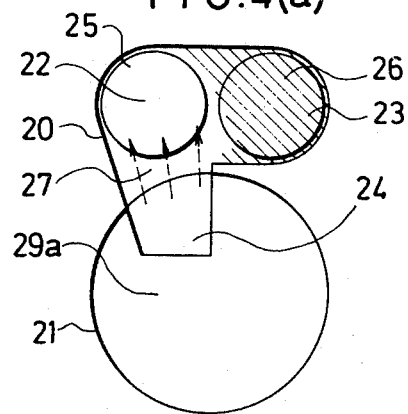
FIGS. 4(a) and 4(b) are phantom views of a combustion chamber embodying the invention, both as seen from above the cylinder head, FIG. 4(a) showing the chamber on the suction stroke and FIG. 4(b) on the compression stroke.
Figure 4B:
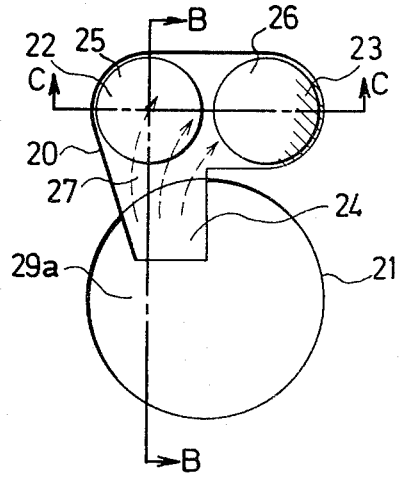
Figure 5:
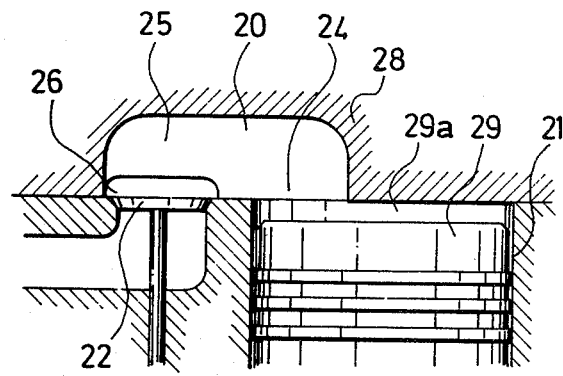
FIGS. 5 and 6 are sectional views taken, respectively, along the lines B—B and C—C of FIG. 4(b).
Figure 6:
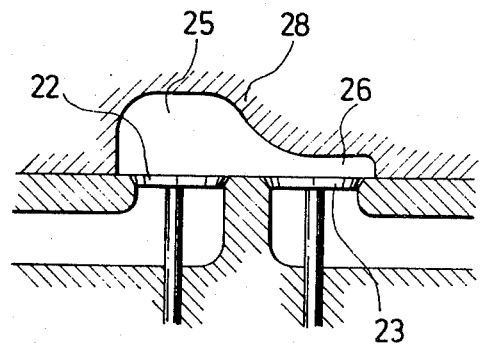

The present invention will now be described in detail with reference to FIGS. 4 to 6 showing an embodiment thereof.

As shown in FIGS. 4(a), 4(b), 5 and 6, the cylinder head 28 has a recess 20 formed therein to permit the flow of suction gas from the suction or inlet valve 22 to the cylinder 21 or the flow of exhaust gas from the cylinder 21 to the exhaust valve 23. This recess 20 combines with the space 29a above the piston 29 to constitute a combustion chamber. As viewed in plan, the recess 20 is of a generally L-shaped configuration covering the suction valve 22, the exhaust valve 23, and an adjacent part of the cylinder 21 and permitting a straight line passage between the suction valve 22 and the cylinder 21 along one leg of the L-shaped recess while connecting the exhaust valve 23 to the cylinder 21 via the other leg of the recess. The junction of the legs of the L-shaped recess being at the suction valve 22, as illustrated in FIGS. 4(a) and 4(b). Flow to and from the cylinder 29 is shown by the dashed lines and arrows in FIGS. 4(a) and 4(b). The flow from the suction valve 22 to the cylinder 29 is along a straight line, while flow from the cylinder to the exhaust valve 23 moves along a somewhat curved line, since first it must traverse the leg running from the cylinder to the suction valve before it turns into the other leg for passage to the exhaust valve.

Figure 1:
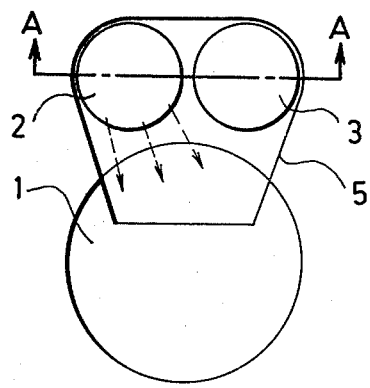
FIGS. 1 and 2 are phantom views of two different combustion chambers of conventional side-valve type internal-combustion engines, both as seen from above the cylinder head.
Figure 2:
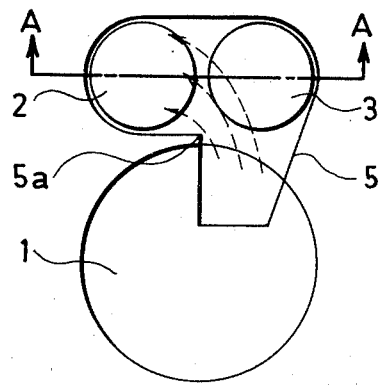
Figure 3:
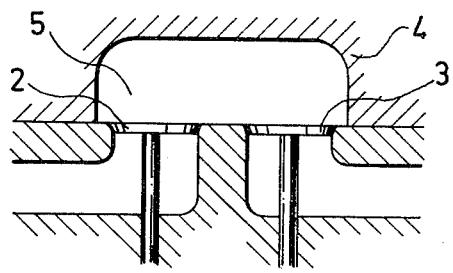
FIG. 3 is a sectional view taken along the line A—A of either FIG. 1 or 2.

The height of the recess 20, for the most part, is substantially equal to that in FIGS. 1 to 3 but, as can be seen from FIG. 6, the height decreases directly above the exhaust valve 23 to a much lower height, with the upper surface forming the recess 20 being quite close to the exhaust valve 23 at the zenith of its upward movement, note FIGS. 5 and 6. An ignition or spark plug 30 is positioned in the wall portion of the cylinder head 28 directly above the suction valve 22, note FIGS. 4(a), 4(b), 5 and 6.

During the suction stroke of the piston 29, a fuel-air mixture is charged from the opening of the suction or inlet valve 22 to the cylinder 21 into a space 25, forming part of the recess 20, immediately above the valve, then through a suction-exhaust-gas passage 27, into a space 24 directly above the cylinder 21. The space 25 is connected through the intermediate passage 27 to the space 24 in a straight-line relation, as indicated by broken-line arrows in FIG. 4(a). Since the flow passage is straight and shorter than in FIG. 2, the charge will meet less resistance through the flow passage.

The remainder of the previous charge, after combustion, is left behind in the space 26 directly above the exhaust valve 23 and, scarcely miscible with the stream of the fresh charge, it remains in the same space as hatched in FIG. 4(a).

On the compression stroke of the piston 29, the charge in the cylinder 21 is compressed and forced with an increasing pressure in the direction indicated by the curved broken-line arrows in FIG. 4(b) that is, it flows through the one leg of the L-shaped recess until it reaches the junction in the recess above the suction valve at which location it then flows into the other leg over the exhaust valve. As the compression stroke nears its completion, the remaining gas is pressed into the space 26 of low height above the exhaust valve so that the fuel air mixture mainly fills the space above the suction valve 22 and that portion of the space above the cylinder 29. At the same time, the residual gas trapped in the space 26 above the exhaust valve 23 is compressed, too, to a reduced volume and is forced to a corner region of the space 26 as hatched in FIG. 4(b). Subsequently, when the ignition plug 30 discharges a spark, the mixture in the space above the suction valve is the first to be ignited and burned while the combustion is transmitted to the fuel-air mixture over the cylinder. The remaining gas passed into the space 26 above the exhaust valve 23 does not participate in the combustion process.

With the construction so far described, the combustion chamber according to the present invention offers the following advantages:

(1) The L-shaped plan configuration of the recess formed in the cylinder head, which establishes straight-line communication between the suction valve and cylinder, reduces the pressure loss in the suction-gas flow passage due to the low flow resistance of that passage.

(2) As stated, the L-shaped plan configuration of the recess is also such that the exhaust valve is communicated with the cylinder through the suction valve, and the height of the recess is significantly decreased in the region directly above the exhaust valve to a level lower than the rest of the upper surface of the recess and adequately close to the exhaust valve in its uppermost position. This permits retention of residual gas in the space above the exhaust valve. Consequently, a very substantial part of the combustion chamber volume during the combustion process is constituted by the space extending from the suction valve to the cylinder via the suction-exhaust-gas passage, and the volume of the combustion chamber per unit surface area of the walls surrounding the chamber is by far larger than that of a conventional side-valve type engine, thus approaching to some degree the so-called spherical combustion chamber. With a combustion chamber of the construction described the period of time required for combustion is shorter than in the ordinary side-valve type engine, and therefore the pressure in the cylinder rises to a higher level. Accordingly, the mean effective pressure increases, thereby enhancing the power output per stroke volume and saving the fuel consumption. Furthermore, the shortened combustion time reduces the amount of fuel left unburned, most of which consists of harmful hydrocarbons. Because of the limited wall surface area on which the unburned fuel is allowed to deposit, the noxious hydrocarbon contents of the exhaust can be decreased.

While specific embodiments of the invention have been shown and described in detail to illustrate the application of the inventive principles, it will be understood that the invention may be embodied otherwise without departing from such principles.

What is claimed is:

1. A side-valve type internal-combustion engine comprising a cylinder having an axial direction and a cylinder head extending transversely of the axial direction of and covering said cylinder, an inlet valve and an exhaust valve disposed in side-by-side relation and each located laterally outwardly from and approximately equidistant from said cylinder, said cylinder head extending laterally outwardly from said cylinder over and covering said inlet valve and exhaust valve, a recess formed in said cylinder head and being of a size sufficient to permit flow alternately therethrough between said inlet valve and said cylinder and said cylinder and said exhaust valve, wherein the improvement comprises that said recess opens to said inlet and exhaust valves and to the portion of said cylinder located laterally adjacent to said inlet and exhaust valves, said recess in said section taken transversely of the axial direction of said cylinder having an L-shaped configuration comprising a first leg and a second leg with said first and second legs being arranged approximately at right angles to one another, the junction of said first and second legs located above said inlet valve, said first leg of said recess extending from said cylinder to said inlet valve and said second leg extending from said inlet valve to said exhaust valve, said first leg having a pair of laterally spaced straight sides forming a straight sided passage for flow between said cylinder and said inlet valve, said pair of straight sides each located in a plane extending generally parallel to the axial direction of said cylinder, said pair of straight sides comprising a first side and a second side with said first and second sides disposed in diverging relation from said cylinder toward said inlet valve, said first side being located closer to said exhaust valve than said second side, said second leg extending from said inlet valve to said exhaust valve in the L-shaped configuration and forming a continuation of the passage in said first leg so that flow from said cylinder to said exhaust valve follows a generally L-shaped curved path first traversing said first leg to the junction with said second leg over said inlet valve before continuing through said second leg to said exhaust valve, said second leg having a pair of laterally spaced straight sides comprising a third side and a fourth side each located in a plane extending parallel to the axial direction of said cylinder with said third and fourth sides being spaced apart from one another and in generally parallel relation, said third side being closer to said cylinder than said fourth side and said third side being perpendicular to and extending from the end of said first side located outwardly from each cylinder, and said recess having a lower surface opening to the upper end of said cylinder and containing said inlet valve and said exhaust valve at the uppermost positions thereof and an upper surface spaced upwardly from said lower surface and comprising a first upper surface extending for the full extent of said first leg from above said cylinder to above said inlet valve, and a second upper surface extending for that portion of said second leg directly above said exhaust valve with said second upper surface being considerably closer to said lower surface than said first upper surface and forming a considerably reduced height of the recess directly over said exhaust valve and being quite close to said exhaust valve when it is in its uppermost position corresponding to said lower surface, said second upper surface being closer to said lower surface than any other part of said upper surface, and an ignition plug located in said first upper surface directly above said inlet valve for effecting the initial combustion of a fuel-air mixture in said recess in the space above said inlet valve.

* * * * *